(12) United States Patent
Pi et al.

(10) Patent No.: US 9,386,473 B2
(45) Date of Patent: Jul. 5, 2016

(54) METHODS AND APPARATUS FOR CHANNEL QUALITY INDICATION FEEDBACK IN A COMMUNICATION SYSTEM

(71) Applicant: QUALCOMM INCORPORATED, San Diego, CA (US)

(72) Inventors: Zhouyue Pi, Richardson, TX (US); Jianzhong Zhang, Irving, TX (US); Farooq Khan, Allen, TX (US); Jiannan Tsai, Plano, TX (US)

(73) Assignee: QUALCOMM INCORPORATED, San Diego, CA (US)

( * ) Notice: Subject to any disclaimer, the term of this patent is extended or adjusted under 35 U.S.C. 154(b) by 74 days.

(21) Appl. No.: 14/199,952

(22) Filed: Mar. 6, 2014

(65) Prior Publication Data

US 2014/0211635 A1 Jul. 31, 2014

Related U.S. Application Data

(62) Division of application No. 12/232,376, filed on Sep. 16, 2008, now Pat. No. 8,699,960.

(60) Provisional application No. 61/008,567, filed on Dec. 21, 2007.

(51) Int. Cl.
  *H04B 1/00* (2006.01)
  *H04W 24/10* (2009.01)
  *H04L 1/00* (2006.01)

(52) U.S. Cl.
  CPC ............. *H04W 24/10* (2013.01); *H04L 1/0026* (2013.01); *H04L 1/0029* (2013.01)

(58) Field of Classification Search
  CPC .................................................... H04L 1/0026
  USPC ............................... 455/62, 69, 403; 714/759
  See application file for complete search history.

(56) References Cited

U.S. PATENT DOCUMENTS

| 8,014,455 B2 | 9/2011 | Kim et al. |
| 2002/0056066 A1* | 5/2002 | Gesbert ................. H04L 1/0016 714/759 |

(Continued)

FOREIGN PATENT DOCUMENTS

| CN | 101001166 A | 7/2007 |
| CN | 101043291 A | 9/2007 |

(Continued)

OTHER PUBLICATIONS

3GPP TSG RAN WG1 Meeting #51, R1-075069, Summary of AH Session on Al 6.4.5 UE Procedures for Downlink Shared Channel', Jeju, Korea, Nov. 5-9, 2007.

(Continued)

*Primary Examiner* — Hsin-Chun Liao
(74) *Attorney, Agent, or Firm* — Seyfarth Shaw LLP

(57) ABSTRACT

Methods and apparatus for feeding back channel quality indication in a communication system. First, a first channel quality indication index is determined in dependence upon a channel quality estimation of a first transmission channel, and a second channel quality indication index is determined in dependence upon a channel quality estimation of a second transmission channel. A differential channel quality indication index of the second channel quality indication index is determined with reference to the first channel quality indication index in dependence upon a differential compression scheme. Then, the first channel quality indication index and the differential channel quality indication index are reported.

12 Claims, 6 Drawing Sheets

(56) References Cited

U.S. PATENT DOCUMENTS

| | | | |
|---|---|---|---|
| 2004/0141466 | A1 | 7/2004 | Kim et al. |
| 2004/0179469 | A1 | 9/2004 | Attar et al. |
| 2005/0201295 | A1 | 9/2005 | Kim et al. |
| 2007/0026808 | A1 | 2/2007 | Love et al. |
| 2007/0254603 | A1* | 11/2007 | Li .................. H04B 7/0632 455/88 |
| 2009/0109909 | A1 | 4/2009 | Onggosanusi et al. |
| 2009/0163142 | A1 | 6/2009 | Pi et al. |

FOREIGN PATENT DOCUMENTS

| | | | |
|---|---|---|---|
| EP | 1750407 | A1 | 2/2007 |
| EP | 1786129 | A1 | 5/2007 |
| EP | 1816772 | A1 | 8/2007 |
| EP | 2012552 | A1 | 1/2009 |
| JP | 2007110513 | A | 4/2007 |
| JP | 2007288676 | A | 11/2007 |
| WO | 2004084450 | | 9/2004 |
| WO | 2006059566 | A1 | 6/2006 |
| WO | 2007112371 | A1 | 10/2007 |
| WO | 2007125702 | A1 | 11/2007 |
| WO | 2009022873 | A2 | 2/2009 |

OTHER PUBLICATIONS

3GPP TSG-RAN WG1 #51, R1-075037, Draft Change Request to TS 36.212 v8.0.0, Jeju, Korea, 5-9 Nov. 1, 2007.

CQI Table Construction, [LTE], email discussion on 3GPP RANI email reflector, Dec. 2007.

European Search Report—EP08171981—Search Authority—The Hague—Aug. 16, 2013.

LG Electronics: "CQI overhead reduction for MIMO in spatial domain", 3GPP Draft; R1-071544, 3rd Generation Partnership Project (3GPP), Mobile Competence Centre ; 650, Route Des Lucioles ; F-06921 Sophia-Antipolis Cedex ; France, vol. RAN WG1, No. St. Julian; Apr. 3, 2007, XP050105475.

Notification of Transmittal of the International Search Report and the Written Opinion of the International Searching Authority, or the Declaration dated Jul. 29, 2009 in connection with PCT Application No. PCT/KR2008/007382.

Supplementary European Search Report—EP08865616—Search Authority—The Hague—Aug. 16, 2016.

Texas Instruments, "All Sub-band Differential CQI Feedback for E-UTRA," 3GPP TSG RAN WG1 51 R1-074694, Oct. 30, 2007.

Texas Instruments, "Design Aspects of UE Feedback," 3GPP TSG RAN WG1 51 R1-074695, Oct. 30, 2007.

* cited by examiner

METHODS AND APPARATUS FOR CHANNEL QUALITY INDICATION FEEDBACK IN A COMMUNICATION SYSTEM

CLAIM OF PRIORITY

This application is a divisional of U.S. patent application Ser. No. 12/232,376, filed on Sep. 16, 2008, now U.S. Pat. No. 8,699,960, which claims the benefit of U.S. Provisional Application No. 61/008,567, filed on Dec. 21, 2007, the disclosures of which are expressly incorporated by reference herein in their entirety.

BACKGROUND OF THE INVENTION

1. Field of the Invention

The present invention relates to methods and apparatus for feeding back channel quality indication in a communication system.

2. Description of the Related Art

This application, pursuant to 37 C.F.R. §1.57, incorporates by reference the following publications:

[1] 3GPP R1-075037, "Draft Change Request to TS 36.212 v8.0.0";

[2] 3GPP R1-075069, "Summary of AH session on AI 6.4.5 "UE Procedures for downlink shared channel"", Samsung;

[3] "[LTE] CQI table construction", email discussions on 3GPP RAN1 email reflector.

Table 1 shows an example of a channel quality indication (CQI) table. Each CQI index of the table represents the channel condition estimated by a mobile station (i.e., User Equipment or UE). For a given channel condition, the most appropriate CQI index is selected and fed back by the mobile station. As an example, as shown in Table 1, if CQI index 9 is reported, the UE recommends modulation and coding scheme (MCS) as quadrature phase-shift keying (QPSK), 1/4 code rate (64/256=1/4). Note that this recommendation only serves as an input for the base station (i.e., Node B) to make a scheduling decision. The Node B may or may not follow the recommendation by the UE. Also note that there are various ways of constructing the table. For example, the table may be constructed with a subset of the columns as shown in Table 1. As an example, the table may consist of the CQI index column, the modulation column, and the code rate column. Or, alternatively, the table may consist of the CQI index column, the nominal transport block size (TBS) column, and (optionally) the modulation column.

TABLE 1

An example of CQI table

| CQI index | Modulation | Code Rate × 256 | Nominal spectral efficiency | Nominal TBS |
|---|---|---|---|---|
| 0 | N/A | N/A | N/A | N/A |
| 1 | QPSK | 10 | 0.078125 | 40 |
| 2 | QPSK | 13 | 0.1015625 | 48 |
| 3 | QPSK | 16 | 0.125 | 64 |
| 4 | QPSK | 20 | 0.15625 | 72 |
| 5 | QPSK | 26 | 0.203125 | 96 |
| 6 | QPSK | 32 | 0.25 | 120 |
| 7 | QPSK | 40 | 0.3125 | 152 |
| 8 | QPSK | 51 | 0.3984375 | 192 |
| 9 | QPSK | 64 | 0.5 | 240 |
| 10 | QPSK | 83 | 0.6484375 | 312 |
| 11 | QPSK | 100 | 0.78125 | 376 |
| 12 | QPSK | 120 | 0.9375 | 448 |
| 13 | QPSK | 140 | 1.09375 | 528 |

TABLE 1-continued

An example of CQI table

| CQI index | Modulation | Code Rate × 256 | Nominal spectral efficiency | Nominal TBS |
|---|---|---|---|---|
| 14 | QPSK | 161 | 1.2578125 | 608 |
| 15 | 16 QAM | 84 | 1.3125 | 624 |
| 16 | 16 QAM | 100 | 1.5625 | 752 |
| 17 | 16 QAM | 115 | 1.796875 | 864 |
| 18 | 16 QAM | 131 | 2.046875 | 976 |
| 19 | 16 QAM | 147 | 2.296875 | 1088 |
| 20 | 16 QAM | 163 | 2.546875 | 1216 |
| 21 | 16 QAM | 181 | 2.828125 | 1344 |
| 22 | 16 QAM | 199 | 3.109375 | 1504 |
| 23 | 64 QAM | 138 | 3.234375 | 1568 |
| 24 | 64 QAM | 151 | 3.5390625 | 1696 |
| 25 | 64 QAM | 165 | 3.8671875 | 1856 |
| 26 | 64 QAM | 179 | 4.1953125 | 2016 |
| 27 | 64 QAM | 194 | 4.546875 | 2176 |
| 28 | 64 QAM | 209 | 4.8984375 | 2368 |
| 29 | 64 QAM | 221 | 5.1796875 | 2496 |
| 30 | 64 QAM | 231 | 5.4140625 | 2624 |
| 31 | 64 QAM | 236 | 5.53125 | 2688 |

Contemporarily, when a UE feeds back a CQI index selected from Table 1, the UE has to use 5 bits for the CQI index, which creates a large overhead for the control signal.

SUMMARY OF THE INVENTION

It is therefore an object of the present invention to provide an improved method and apparatus for feeding back CQI index.

According to one aspect of the present invention, a sub-table is established from an original channel quality indication table. When a channel quality indication index is selected from the channel quality indication sub-table, an index within the sub-table of the selected channel quality indication index is reported.

According to another aspect of the present invention, channel quality estimations are obtained for a plurality of transmission channels. A first channel quality indication index is determined in dependence upon a channel quality estimation of a first transmission channel, and a second channel quality indication index is determined in dependence upon a channel quality estimation of a second transmission channel. A differential channel quality indication index of the second channel quality indication index is determined with reference to the first channel quality indication index in dependence upon a differential compression scheme. Then, the first channel quality indication index and the differential channel quality indication index are reported.

In this case, when a terminal receives the first channel quality indication index and the differential channel quality indication index, the terminal derives the second channel quality indication index in dependence upon the received first channel quality indication index, the received differential channel quality indication index and the differential compression scheme.

The differential compression scheme may be established by $$\tilde{Q}_{SB,i} = Q_{SB,i} - Q_{WB},$$

where $\tilde{Q}_{SB,i}$ denotes the differential channel quality indication index, $Q_{WB}$ denotes the first channel quality indication index, and $Q_{SB,i}$ denotes the second channel quality indication index.

Alternatively, the differential compression scheme being established by $$\tilde{Q}_{SB,i} = \min\left(I_{SB,max}, \max\left(I_{SB,min}, \left\lfloor \frac{Q_{SB,i} - Q_{WB}}{L} \right\rfloor\right)\right),$$

where $\tilde{Q}_{SB,i}$ denotes the differential channel quality indication index, $Q_{WB}$ denotes the first channel quality indication index, $Q_{SB,i}$ denotes the second channel quality indication index, $I_{SB,max}$ and $I_{SB,min}$ respectively denotes upper and lower limits of the differential channel quality indication index, and L denotes a resolution value.

The values of the upper and lower limits of the differential channel quality indication index, $I_{SB,max}$ and $I_{SB,min}$ may be adjusted in dependence upon the value of the first channel quality indication index, $Q_{WB}$.

Still alternatively, the differential compression scheme may be established by:

$$\tilde{Q}_{SB,i} = \min\left(I_{SB,max}, \max\left(I_{SB,min}, \left\lfloor \frac{Q_{WB} - Q_{SB,i}}{L} \right\rfloor\right)\right).$$

Still alternatively, the differential compression scheme may be established by:

$$\tilde{Q}_{SB,i} = \min\left(I_{SB,max}, \max\left(I_{SB,min}, \left\lfloor \frac{Q_{SB,i} - Q_{WB} + \Delta}{L} \right\rfloor\right)\right),$$

where $\Delta$ denotes an offset value.

The offset $\Delta$ may be determined in dependence upon the first channel quality indication index $Q_{WB}$, with the offset $\Delta$ being established by:

$$\Delta = \max(\min(Q_{WB} - I_{WB,min}, \Delta_{default}), Q_{WB} + I_{SB,max} - I_{WB,max})$$

where $I_{WB,max}$ and $I_{WB,min}$ respectively denotes upper and lower limits of the first channel quality indication index, and $\Delta_{default}$ denotes a certain default offset.

The first channel quality indication index may include more bits than the differential channel quality indication index.

According to yet another aspect of the present invention, channel quality estimations are obtained for a wideband channel and at least one subband channel. In dependence upon the channel quality estimations, a wideband channel quality indication index, and at least one subband channel quality indication index corresponding to the at least one subband channel are determined. Then, at least one differential channel quality indication index corresponding to the at least one subband channel quality indication index is determined with reference to the wideband channel quality indication index in dependence upon a differential compression scheme. Finally, the wideband channel quality indication index and the at least one differential channel quality indication index are reported.

According to still another aspect of the present invention, a wideband channel quality indication (CQI) index and a subband CQI index in each subband corresponding to each of a plurality of codewords in dependence upon channel quality estimations. A first wideband CQI index corresponding to a first codeword is selected as a first reference, and a wideband delta CQI index for each of the other wideband CQI indices corresponding to the other codewords is determined with reference to the first wideband CQI index in dependence upon a differential compression scheme. In each subband, a subband differential CQI index for the subband CQI index corresponding to the first codeword is determined with reference to the first wideband CQI index in dependence upon the differential compression scheme. A subband delta CQI index for each of the other subband CQI indices corresponding to the other codewords is determined with reference to the subband differential CQI index in dependence upon the differential compression scheme. Finally, the wideband CQI index corresponding to the first codeword, and the wideband delta CQI indices corresponding to the other codewords are reported. The subband differential CQI index corresponding to the first codeword, and the subband delta CQI indices corresponding to the other codewords are reported in each subband.

The wideband CQI index may contain more bits than each subband differential CQI index, and each subband differential CQI index comprising more bits than each subband delta CQI index.

The CQI indices may be reported by using different number of bits in different transmission formats.

According to a further aspect of the present invention, a plurality of channel quality indication indices are determined in dependence upon the channel quality estimations. An average channel quality indication index is calculated based upon the plurality of channel quality indication indices. A differential channel quality indication index is determined for each of the plurality of channel quality indication indices with reference to the average channel quality indication index in dependence upon a differential compression scheme. Then, the average channel quality indication index and the plurality of differential channel quality indication indices may be reported with one of the differential channel quality indication indices being omitted from transmission. Then, at the receiver side, the plurality of channel quality indication indices may be derived in dependence upon the average channel quality indication index and the differential channel quality indication indices with one of them omitted.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
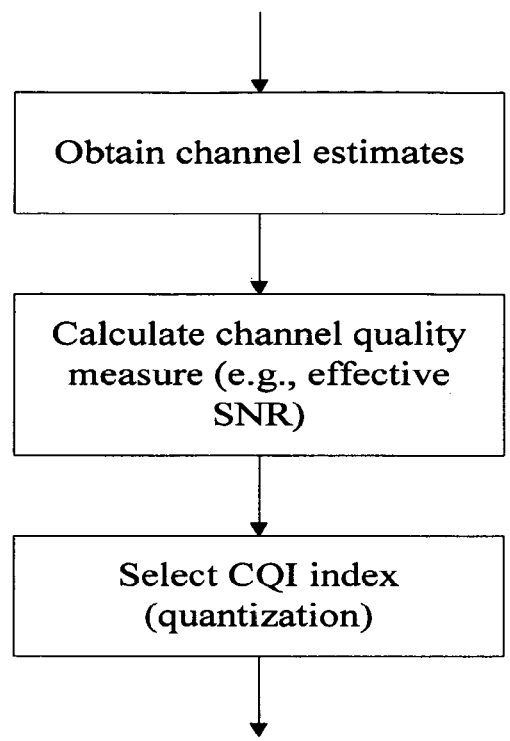
FIG. 1(a) schematically illustrates a method for calculating a full CQI index as an embodiment according to the principles of the present invention.

In this invention, we propose methods and apparatus to improve the performance and reduce the overhead of channel quality indication feedback in a communication system.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings. In the following illustrations, we use the downlink channel quality indication (CQI) feedback in the uplink of 3GPP LTE systems as an example. However, the technique illustrated here can certainly be used in uplink CQI feedback in the downlink in LTE systems and other systems whenever applicable.

In a first embodiment according to the principles of the present invention, a communication station creates a CQI sub-table by selecting a subset of entries in the CQI table and reports CQI index or infers channel quality from CQI index based on the CQI sub-table. In other words, the communication station reports the index-within-the-sub-table of the CQI index, instead of reporting the index-within-the-original-table of the CQI index.

In a first sub-embodiment of the first embodiment according to the principles of the present invention, a CQI sub-table can be constructed by selecting the rows with CQI indices 16~31. If such a CQI sub-table is used for a UE's CQI reporting, the UE will only need 4 bits for reporting the index-within-the-sub-table of the CQI index, which reduces overhead. Note the dynamic range covered by this sub-table is reduced to half of the dynamic range of the original table. This example is shown in Table 2.

TABLE 2

An example of CQI sub-table

| Sub-table CQI index | CQI index | Modulation | Code Rate × 256 | Nominal spectral efficiency | Nominal TBS |
|---|---|---|---|---|---|
| 0 | 16 | 16 QAM | 100 | 1.5625 | 752 |
| 1 | 17 | 16 QAM | 115 | 1.796875 | 864 |
| 2 | 18 | 16 QAM | 131 | 2.046875 | 976 |
| 3 | 19 | 16 QAM | 147 | 2.296875 | 1088 |
| 4 | 20 | 16 QAM | 163 | 2.546875 | 1216 |
| 5 | 21 | 16 QAM | 181 | 2.828125 | 1344 |
| 6 | 22 | 16 QAM | 199 | 3.109375 | 1504 |
| 7 | 23 | 64 QAM | 138 | 3.234375 | 1568 |
| 8 | 24 | 64 QAM | 151 | 3.5390625 | 1696 |
| 9 | 25 | 64 QAM | 165 | 3.8671875 | 1856 |
| 10 | 26 | 64 QAM | 179 | 4.1953125 | 2016 |
| 11 | 27 | 64 QAM | 194 | 4.546875 | 2176 |
| 12 | 28 | 64 QAM | 209 | 4.8984375 | 2368 |
| 13 | 29 | 64 QAM | 221 | 5.1796875 | 2496 |
| 14 | 30 | 64 QAM | 231 | 5.4140625 | 2624 |
| 15 | 31 | 64 QAM | 236 | 5.53125 | 2688 |

In a second sub-embodiment of the first embodiment according to the principles of the present invention, a sub-table can be constructed by selecting the rows with even number of CQI indices like 0, 2, ..., 30. Again, only 4 bits are needed for reporting an index-within-the-sub-table of CQI index (before considerations of CQI compression). This sub-table can have the same or similar dynamic range as the original table, but with coarser resolution. This example is shown in Table 3.

TABLE 3

Another example of CQI sub-table

| Sub-table CQI index | CQI index | Modulation | Code Rate × 256 | Nominal spectral efficiency | Nominal TBS |
|---|---|---|---|---|---|
| 0 | 0 | N/A | N/A | N/A | N/A |
| 1 | 2 | QPSK | 13 | 0.1015625 | 48 |
| 2 | 4 | QPSK | 20 | 0.15625 | 72 |
| 3 | 6 | QPSK | 32 | 0.25 | 120 |
| 4 | 8 | QPSK | 51 | 0.3984375 | 192 |
| 5 | 10 | QPSK | 83 | 0.6484375 | 312 |
| 6 | 12 | QPSK | 120 | 0.9375 | 448 |
| 7 | 14 | QPSK | 161 | 1.2578125 | 608 |
| 8 | 16 | 16 QAM | 100 | 1.5625 | 752 |
| 9 | 18 | 16 QAM | 131 | 2.046875 | 976 |
| 10 | 20 | 16 QAM | 163 | 2.546875 | 1216 |
| 11 | 22 | 16 QAM | 199 | 3.109375 | 1504 |
| 12 | 24 | 64 QAM | 151 | 3.5390625 | 1696 |
| 13 | 26 | 64 QAM | 179 | 4.1953125 | 2016 |
| 14 | 28 | 64 QAM | 209 | 4.8984375 | 2368 |
| 15 | 30 | 64 QAM | 231 | 5.4140625 | 2624 |

In a third sub-embodiment of the first embodiment according to the principles of the present invention, a sub-table can be constructed by selecting several rows of CQI indices from the original table. Then, a few more rows can be added to the sub-table to increase the resolution of the sub-table higher than the resolution of the original table. For example, we can select CQI indices 3, 4, 5, 6, 7, 8, 9, 10 to construct the sub-table. We can add a few rows to the sub-table to increase the resolution. This example is shown in Table 4.

TABLE 4

Another example of CQI sub-table

| Sub-table CQI index | CQI index | Modulation | Code Rate × 256 | Nominal spectral efficiency | Nominal TBS |
|---|---|---|---|---|---|
| 0 | 3 | QPSK | 16 | 0.125 | 64 |
| 1 | New | QPSK | 18 | 0.140625 | 68 |
| 2 | 4 | QPSK | 20 | 0.15625 | 72 |
| 3 | New | QPSK | 23 | 0.1796875 | 84 |
| 4 | 5 | QPSK | 26 | 0.203125 | 96 |
| 5 | New | QPSK | 29 | 0.2265625 | 108 |
| 6 | 6 | QPSK | 32 | 0.25 | 120 |
| 7 | New | QPSK | 36 | 0.28125 | 136 |
| 8 | 7 | QPSK | 40 | 0.3125 | 152 |
| 9 | New | QPSK | 46 | 0.359375 | 172 |
| 10 | 8 | QPSK | 51 | 0.3984375 | 192 |
| 11 | New | QPSK | 58 | 0.453125 | 216 |
| 12 | 9 | QPSK | 64 | 0.5 | 240 |
| 13 | New | QPSK | 74 | 0.578125 | 276 |
| 14 | 10 | QPSK | 83 | 0.6484375 | 312 |
| 15 | New | QPSK | 92 | 0.71875 | 348 |

In a second embodiment according to the principles of the present invention, different CQI tables constructed from the same original CQI table are used to report (at the UE) or to interpret (at the base station) different kinds of CQI. In other words, the communication stations can use the same CQI table with different resolution and/or different dynamic range to report or interpret different kinds of CQI. In many cases, a UE may report more than one kind of CQI to the base station. Examples of the different kinds of CQI are wideband CQI, transmit diversity CQI, average CQI, sub-band CQI, Multiple Input Multiple Output (MIMO) CQI, etc. Different CQI tables can be used for these different kinds of CQI. These different CQI tables can be independently constructed, or can be constructed from the same original CQI table. For example, a UE may report both wideband CQI and sub-band CQI. Because the current invention focuses on the case that the different CQI tables are constructed from the same original table, examples in which the CQI tables for sub-band CQI and the wideband CQI are independently constructed are not provided. The wideband CQI is averaged over a set of sub-bands, which typically cover a large bandwidth. To reduce the overhead of CQI reporting, a differential compression scheme is used. With this approach, the differences between the sub-band CQIs and the wideband CQI, which we call differential sub-band CQI, are reported together with the wideband CQI. In this case, the wideband CQI is reported using a full CQI, the sub-band CQI can be reported using a differential CQI. As another example, a UE may report CQI for MIMO codeword 1 and MIMO codeword 2. In that case, a full CQI can be reported for the CQI of MIMO codeword 1, while the difference between the CQI for MIMO codeword 1 and codeword 2 can be reported as a differential CQI. As yet another example, a UE may report the CQI of one or multiple MIMO codeword using a full CQI and report the gain due to successive interference cancellation as a differential CQI. Successive interference cancellation typically increases the CQI of the second MIMO codeword to be more than the CQI of the first MIMO codeword. In that case, the gain can be viewed as a differential CQI between the CQI of the first MIMO codeword and the CQI of the second MIMO codeword. Typically, a full CQI is reported with a larger number of bits while a differential sub-band CQI is reported with a smaller number of bits. This differential compression reduces the number of bits needed for reporting more than one CQI. Since the full CQI is used as a reference for the differential CQI, sometimes it is preferable to report the full CQI with higher resolution and/or larger dynamic range than the differential CQI. For example, 5 bits can be used for a full CQI report while 3 bits can be used for a differential CQI. A CQI table with 32 entries as shown in Table 5 can be used to report a full CQI. The differential compression approach can be viewed as constructing a smaller CQI sub-table from the original CQI table for reporting the differential CQI. As an example, assuming the full CQI index is 22, a 3-bit differential CQI sub-table can be constructed by selecting 8 rows around CQI index 22 from the original CQI table.

TABLE 5

An example of CQI sub-table for differential CQI

| Sub-table CQI index | CQI index | Modulation | Code Rate × 256 | Nominal spectral efficiency | Nominal TBS |
| --- | --- | --- | --- | --- | --- |
| 0 | 19 | 16 QAM | 147 | 2.296875 | 1088 |
| 1 | 20 | 16 QAM | 163 | 2.546875 | 1216 |
| 2 | 21 | 16 QAM | 181 | 2.828125 | 1344 |
| 3 | 22 | 16 QAM | 199 | 3.109375 | 1504 |
| 4 | 23 | 64 QAM | 138 | 3.234375 | 1568 |
| 5 | 24 | 64 QAM | 151 | 3.5390625 | 1696 |
| 6 | 25 | 64 QAM | 165 | 3.8671875 | 1856 |
| 7 | 26 | 64 QAM | 179 | 4.1953125 | 2016 |

Note in this case, we selected 3 CQI indices smaller than the full CQI index, the full CQI index, and 4 CQI indices larger than the full CQI index. By doing so, the constructed CQI sub-table can support both positive and negative differential CQI values.

As another example, the differential CQI sub-table can be constructed around the full CQI index with a different resolution. For example, the differential CQI sub-table can be constructed with a larger step, e.g., by taking every two CQI indices around the full CQI index. Again assuming the full CQI index is 22, a 3-bit differential CQI sub-table can be constructed by selecting 8 rows around CQI index 22 from the original CQI table as shown in Table 6.

TABLE 6

Another example of CQI sub-table for differential CQI

| Sub-table CQI index | CQI index | Modulation | Code Rate × 256 | Nominal spectral efficiency | Nominal TBS |
| --- | --- | --- | --- | --- | --- |
| 0 | 16 | 16 QAM | 100 | 1.5625 | 752 |
| 1 | 18 | 16 QAM | 131 | 2.046875 | 976 |
| 2 | 20 | 16 QAM | 163 | 2.546875 | 1216 |
| 3 | 22 | 16 QAM | 199 | 3.109375 | 1504 |
| 4 | 24 | 64 QAM | 151 | 3.5390625 | 1696 |
| 5 | 26 | 64 QAM | 179 | 4.1953125 | 2016 |
| 6 | 28 | 64 QAM | 209 | 4.8984375 | 2368 |
| 7 | 30 | 64 QAM | 231 | 5.4140625 | 2624 |

For illustration purpose, assume the full CQI is the wideband CQI and the differential CQI is the sub-band differential CQI. Note that the following embodiments are also applicable when the full CQI and differential CQI represent other types of CQI, such as MIMO CQI and MIMO delta CQI.

Assume the wideband channel is represented by a matrix $\bar{\alpha}_{WB} = [\bar{\alpha}_{SB,i_0}, \bar{\alpha}_{SB,i_1}, \ldots \bar{\alpha}_{SB,i_{N-1}}]^T$ where $\bar{\alpha}_{SB,i_k}$ is the channel matrix for sub-band $i_k$. In some cases, intermediate measures such as channel capacity, mutual information, transport block size, or effective Signal-to-noise ratio (SNR) can be obtained from estimates of these channel matrices. The reported wideband CQI index is $Q_{WB} = q(\bar{\alpha}_{WB})$ and the sub-band CQI index before differential compression is $Q_{SB,i} = q(\bar{\alpha}_{SB,i})$ where $q(\cdot)$ is the UE's measurement function that selects a CQI index based on channel matrices. The CQI index reported for the wideband CQI is $Q_{WB} = q(\bar{\alpha}_{WB})$, while the CQI index reported for the sub-band CQI is $\tilde{Q}_{SB,i} = p(Q_{SB,i}) = p(q(\bar{\alpha}_{SB,i}))$ where $p(\cdot)$ is the UE's differential compression scheme for differential sub-band CQI. As an example of this embodiment, the sub-band differential CQI index is defined as the sub-band CQI index subtracted by the wideband CQI index. An exemplary mathematical representation is as follows, $$\tilde{Q}_{SB,i} = \min\left(I_{SB,max}, \max\left(I_{SB,min}, \left\lfloor \frac{Q_{SB,i} - Q_{WB}}{L} \right\rfloor\right)\right), \quad (1)$$

where $\tilde{Q}_{SB,i}$ is the differential CQI calculated by the transmitter, $I_{SB,max}$ and $I_{SB,min}$ respectively represents upper and lower limits of the differential CQI index, and L is a certain value for adjusting the resolution of the CQI sub-table. Note that the upper and lower limits are applied to make sure the reported differential CQI index is within the desired range. For example, we can set the upper limit and the lower limit such that $I_{SB,min} = I_{SB,max} - 7$ to make sure the differential CQI index can be represented by 3 bits. At the receiver side, the sub-band CQI index can be obtained by adding the differential sub-band CQI index back to the wideband CQI index. An exemplary mathematical representation is as follows, $$\hat{Q}_{SB,i} = \min(I_{WB,max}, \max(I_{WB,min}, Q_{WB} + L \times \tilde{Q}_{SB,i})). \quad (2)$$

where $\hat{Q}_{SB,i}$ is the sub-band CQI calculated by the received based on the received $\tilde{Q}_{SB,i}$ and $Q_{WB}$, $I_{WB,max}$ and $I_{WB,min}$ respectively represents upper and lower limits of the wideband CQI index. Due to range limit and transmission error, $\hat{Q}_{SB,i}$ and $Q_{SB,i}$ may not be the same. Without range limit or transmission error, these two quantities would be the same. As an example, we can set $I_{SB,max}=+3$, $I_{SB,min}=-4$, $I_{WB,max}=31$, and $I_{WB,min}=0$ for a 5-bit wideband CQI and a 3-bit different sub-band CQI. L is used to adjust the resolution of the CQI sub-table for the differential sub-band CQI. For example, we can set L=2 to achieve a larger dynamic range for the differential sub-band CQI. Note that in order to use 3 bits to represent the differential sub-band CQI with a range from 4 to 3, we need to define a mapping between the 8 binary values to the 8 differential sub-band CQI values. A typical mapping is the "2's complement" representation of signed integers, which define the negation of a positive integer by flipping every bit of a positive integer and adding the outcome by 1. The mapping for 3-bit signed integers is shown in Table 7.

TABLE 7

Signed integers and its 2's complement representation

| Representation | Value |
|---|---|
| 000 | 0 |
| 001 | 1 |
| 010 | 2 |
| 011 | 3 |
| 111 | −1 |
| 110 | −2 |
| 101 | −3 |
| 100 | −4 |

Alternatively, the sub-band differential CQI index can be defined as the wideband CQI subtracted by the sub-band CQI. An exemplary mathematical representation is as follows, $$\tilde{Q}_{SB,i} = \min\left(I_{SB,max}, \max\left(I_{SB,min}, \left\lfloor \frac{Q_{WB} - Q_{SB,i}}{L} \right\rfloor\right)\right). \quad (3)$$

At the receiver side, the sub-band CQI index can be obtained by subtracting the differential sub-band CQI from the wideband CQI. An exemplary mathematical representation is as follows, $$\hat{Q}_{SB,i} = \min(I_{WB,max}, \max(I_{WB,min}, Q_{WB} - l \times \tilde{Q}_{SB,i})). \quad (4)$$

As an example, we can set $I_{SB,max}=+3$, $I_{SB,min}=-4$, $I_{WB,max}=31$, and $I_{WB,min}=0$ for a 5-bit wideband CQI and a 3-bit different sub-band CQI. L is used to adjust the resolution of the CQI sub-table for the differential sub-band CQI. For example, we can set L=2 to achieve a larger dynamic range for the differential sub-band CQI. Note the negative relationship between the sub-band CQI and the differential sub-band CQI with this alternative. With the 2's complement rule, there are less quantization levels (indices) above 0 than those below 0 for the differential sub-band CQI. As a result, there are more quantization levels (indices) above the wideband CQI index than those below the wideband CQI index for the sub-band CQI, which is advantageous for scheduling algorithms that favor better channel conditions.

In a third embodiment according to the principles of the present invention, the upper and lower limit indices for the differential CQI can be adjusted depending on the value of the full CQI. The full CQI represents the CQI index that is selected by a UE based upon the channel condition. In other words, the range of the differential CQI can be adjusted depending on the value of the full CQI. For example, assume the full CQI is 5 bits and uses the original CQI table shown in Table 1. As an example, if the full CQI index is 2, we can construct the differential CQI sub-table as follows:

TABLE 8

Another example of CQI sub-table for differential CQI

| Sub-table CQI index | CQI index | Modulation | Code Rate × 256 | Nominal spectral efficiency | Nominal TBS |
|---|---|---|---|---|---|
| −2 | 0 | N/A | N/A | N/A | N/A |
| −1 | 1 | QPSK | 10 | 0.078125 | 40 |
| 0 | 2 | QPSK | 13 | 0.1015625 | 48 |
| 1 | 3 | QPSK | 16 | 0.125 | 64 |
| 2 | 4 | QPSK | 20 | 0.15625 | 72 |
| 3 | 5 | QPSK | 26 | 0.203125 | 96 |
| 4 | 6 | QPSK | 32 | 0.25 | 120 |
| 5 | 7 | QPSK | 40 | 0.3125 | 152 |

This case corresponds to Equation (1) with $I_{SB,max}=5$ and $I_{SB,min}=-2$. In Table 8, the full CQI index of 2 corresponds to the $Q_{WB}$ in Equation (1); the column of "CQI index" corresponds to the $Q_{SB,i}$ in Equation (1); and, the column of "Sub-table CQI index" corresponds to the differential CQI index $\tilde{Q}_{SB,i}$ in Equation (1). In the example given in Table 8, the UE first selects a wideband CQI index of 2 from Table 1. Then, the UE constructs a differential CQI sub-table (i.e., Table 8) by using the wideband CQI index of 2 as a reference. Afterwards, the UE selects a sub-band CQI of 3 from the differential CQI sub-table. Finally, the UE reports a 5-digit wideband CQI index of 2, and a 3-digit sub-band CQI index of 3. Note that if the UE selects another wideband CQI index, e.g., a wideband CQI index of 5, then, the UE has to construct another differential CQI sub-table.

As another example, if the average CQI index (i.e., the full CQI index) is 10, we can construct the differential CQI sub-table as follows:

TABLE 9

Another example of CQI sub-table for differential CQI

| Sub-table CQI index | CQI index | Modulation | Code Rate × 256 | Nominal spectral efficiency | Nominal TBS |
|---|---|---|---|---|---|
| −3 | 7 | QPSK | 40 | 0.3125 | 152 |
| −2 | 8 | QPSK | 51 | 0.3984375 | 192 |
| −1 | 9 | QPSK | 64 | 0.5 | 240 |
| 0 | 10 | QPSK | 83 | 0.6484375 | 312 |
| 1 | 11 | QPSK | 100 | 0.78125 | 376 |
| 2 | 12 | QPSK | 120 | 0.9375 | 448 |
| 3 | 13 | QPSK | 140 | 1.09375 | 528 |
| 4 | 14 | QPSK | 161 | 1.2578125 | 608 |

This case corresponds to Equation (1) with $I_{SB,max}=4$ and $I_{SB,min}=-3$.

As another example, if the average CQI index is 30, we can construct the differential CQI sub-table as follows:

TABLE 10

Another example of CQI sub-table for differential CQI

| Sub-table CQI index | CQI index | Modulation | Code Rate × 256 | Nominal spectral efficiency | Nominal TBS |
|---|---|---|---|---|---|
| −6 | 24 | 64 QAM | 151 | 3.5390625 | 1696 |
| −5 | 25 | 64 QAM | 165 | 3.8671875 | 1856 |
| −4 | 26 | 64 QAM | 179 | 4.1953125 | 2016 |
| −3 | 27 | 64 QAM | 194 | 4.546875 | 2176 |
| −2 | 28 | 64 QAM | 209 | 4.8984375 | 2368 |
| −1 | 29 | 64 QAM | 221 | 5.1796875 | 2496 |
| 0 | 30 | 64 QAM | 231 | 5.4140625 | 2624 |
| 1 | 31 | 64 QAM | 236 | 5.53125 | 2688 |

This case corresponds to Equation (1) with $I_{SB,max}=1$, and $I_{SB,min}=-6$.

As a first sub-embodiment of the third embodiment according to the principles of the present invention, the sub-band differential CQI index can be defined as the sub-band CQI subtracted by the wideband CQI, plus an offset. An exemplary mathematical representation is as follows, $$\tilde{Q}_{SB,i} = \min\left(I_{SB,max}, \max\left(I_{SB,min}, \left\lfloor \frac{Q_{SB,i} - Q_{WB} + \Delta}{L} \right\rfloor\right)\right). \quad (5)$$

At the receiver side, the sub-band CQI index can be obtained by adding the wideband CQI back to the differential sub-band CQI. An exemplary mathematical representation is as follows, $$\hat{Q}_{SB,i} = \min(I_{WB,max}, \max(I_{WB,min}, Q_{WB} - \Delta + L \times \hat{Q}_{SB,i})). \quad (6)$$

By setting different offset, we can adjust the range of the differential sub-band CQI. One embodiment is to set different offset for different full CQI value. As an example, assume the wideband CQI index is 2. By setting $I_{SB,max}=7$, $I_{SB,min}=0$, and $\Delta=+2$, the differential sub-band CQI values and its mapping to indices is shown as follows:

TABLE 11

Another example of differential sub-band CQI

| Sub-table CQI index | Difference between sub-band CQI and reference | CQI index | Modulation | Code Rate × 256 | Nominal spectral efficiency | Nominal TBS |
|---|---|---|---|---|---|---|
| 0 | −2 | 0 | N/A | N/A | N/A | N/A |
| 1 | −1 | 1 | QPSK | 10 | 0.078125 | 40 |
| 2 | 0 | 2 | QPSK | 13 | 0.1015625 | 48 |
| 3 | 1 | 3 | QPSK | 16 | 0.125 | 64 |
| 4 | 2 | 4 | QPSK | 20 | 0.15625 | 72 |
| 5 | 3 | 5 | QPSK | 26 | 0.203125 | 96 |
| 6 | 4 | 6 | QPSK | 32 | 0.25 | 120 |
| 7 | 5 | 7 | QPSK | 40 | 0.3125 | 152 |

As another example, if the wideband CQI index is 10, by setting $I_{SB,max}=7$, $I_{SB,min}=0$, and $\Delta=+3$, the differential sub-band CQI values and its mapping to indices is shown as follows:

TABLE 12

Another example of differential sub-band CQI

| Sub-table CQI index | Difference between sub-band CQI and reference | CQI index | Modulation | Code Rate × 256 | Nominal spectral efficiency | Nominal TBS |
|---|---|---|---|---|---|---|
| 0 | −3 | 7 | QPSK | 40 | 0.3125 | 152 |
| 1 | −2 | 8 | QPSK | 51 | 0.3984375 | 192 |
| 2 | −1 | 9 | QPSK | 64 | 0.5 | 240 |
| 3 | 0 | 10 | QPSK | 83 | 0.6484375 | 312 |
| 4 | 1 | 11 | QPSK | 100 | 0.78125 | 376 |
| 5 | 2 | 12 | QPSK | 120 | 0.9375 | 448 |
| 6 | 3 | 13 | QPSK | 140 | 1.09375 | 528 |
| 7 | 4 | 14 | QPSK | 161 | 1.2578125 | 608 |

As another example, if the wideband CQI index is 30, by setting $I_{SB,max}=7$, $I_{SB,min}=0$, and $\Delta=+6$, the differential sub-band CQI values and its mapping to indices is shown as follows:

TABLE 13

Another example of differential sub-band CQI

| Sub-table CQI index | Difference between sub-band CQI and reference | CQI index | Modulation | Code Rate × 256 | Nominal spectral efficiency | Nominal TBS |
|---|---|---|---|---|---|---|
| 0 | −6 | 24 | 64 QAM | 151 | 3.5390625 | 1696 |
| 1 | −5 | 25 | 64 QAM | 165 | 3.8671875 | 1856 |
| 2 | −4 | 26 | 64 QAM | 179 | 4.1953125 | 2016 |
| 3 | −3 | 27 | 64 QAM | 194 | 4.546875 | 2176 |
| 4 | −2 | 28 | 64 QAM | 209 | 4.8984375 | 2368 |
| 5 | −1 | 29 | 64 QAM | 221 | 5.1796875 | 2496 |
| 6 | 0 | 30 | 64 QAM | 231 | 5.4140625 | 2624 |
| 7 | 1 | 31 | 64 QAM | 236 | 5.53125 | 2688 |

As a second sub-embodiment of the third embodiment according to the principles of the present invention, by setting the offset appropriately, we can adjust how many quantization levels (indices) are above and below the reference level (wideband CQI index). The offset can be chosen as a function of the full CQI value. One example of such a functional relationship is as follows:

$$\Delta = \max(\min(Q_{WB} - I_{WB,min}, \Delta_{default}), Q_{WB} + I_{SB,max} - I_{WB,max}) \quad (7)$$

Note the default value of $\Delta_{default}$ dictates that how many CQI indices below the full CQI index can be reported, without considering the effect of the upper or lower limit of CQI indices. As an example, assume the lower limit and the upper limit for the full CQI is $I_{WB,min}=0$, and $I_{WB,max}=31$, respectively; assume the lower limit and the upper limit for the differential CQI is $I_{SB,min}=0$, and $I_{SB,max}=7$, respectively; assume the default offset $\Delta_{default}=3$. Equation (7) can be written as $$\Delta = \max(\min(Q_{WB}, 3), Q_{WB} - 24). \quad (8)$$

This equation can be alternatively represented as:

$$\Delta = \begin{cases} Q_{WB}, & \text{if } 0 \leq Q_{WB} \leq 3 \\ 3, & \text{if } 3 < Q_{WB} \leq 27 \\ Q_{WB} - 24, & \text{if } 27 < Q_{WB} \leq 31 \end{cases} \quad (9)$$

Note this embodiment can be alternatively interpreted as different differential CQI value calculation depending on the value of the full CQI. Combining Equation (9) and Equation (5), and the aforementioned assumption on the values of upper and lower limits, the exemplary functional relationship can be represented as $$\tilde{Q}_{SB,i} = \begin{cases} \max(0, \min(7, Q_{SB,i})) & \text{if } 0 \le Q_{WB} \le 3 \\ \max(0, \min(7, Q_{SB,i} - Q_{WB} + 3)) & \text{if } 3 < Q_{WB} \le 27 \\ \max(0, \min(7, Q_{SB,i} - 24)) & \text{if } 27 < Q_{WB} \le 31 \end{cases} \quad (10)$$

By setting the upper and lower limit appropriately, we can control the number of bits used in reporting the differential sub-band CQI. In the examples shown in Table 11, Table 12, and Table 13, since the differential sub-band CQI value is adjusted to be 0~7, the differential sub-band CQI value can be mapped to the 3-bit differential sub-band CQI field using the binary representation of unsigned integers. One example of this representation is shown in Table 14.

TABLE 14

Unsigned integers and its binary representation

| Representation | Value |
|---|---|
| 000 | 0 |
| 001 | 1 |
| 010 | 2 |
| 011 | 3 |
| 100 | 4 |
| 101 | 5 |
| 110 | 6 |
| 111 | 7 |

As an alternative, the sub-band differential CQI index can be defined as the wideband CQI subtracted by a sub-band CQI, plus an offset. Similarly, by setting the offset appropriately, we can adjust how many quantization levels (indices) are above and below the reference level (wideband CQI index). By setting the upper and lower limit appropriately, we can control the number of bits used in reporting the differential sub-band CQI.

Figure 1B:
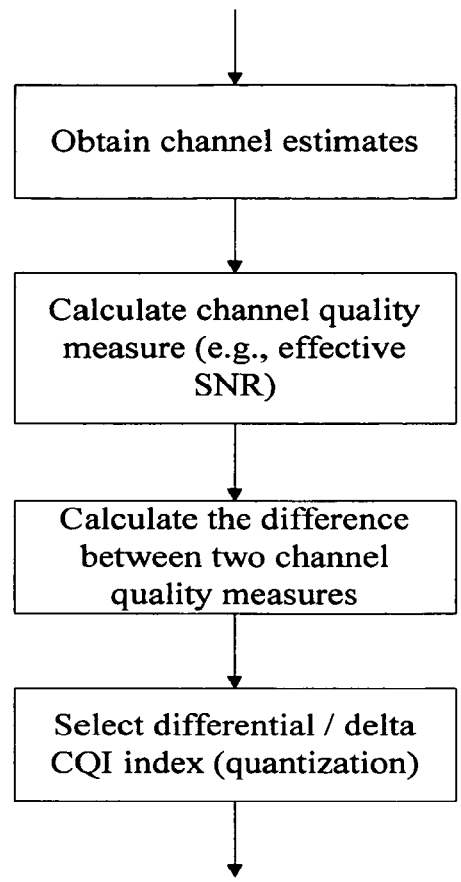
FIG. 1(b) schematically illustrates a method for calculating a differential/delta CQI index as an embodiment according to the principles of the present invention.
Figure 1C:
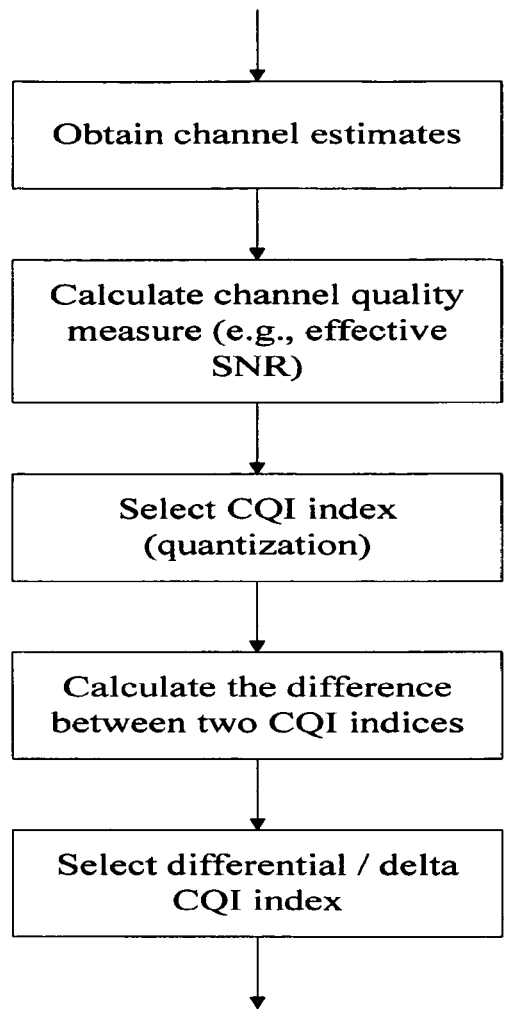
FIG. 1(c) schematically illustrates a method for calculating a differential/delta CQI index as another embodiment according to the principles of the present invention.

FIGS. 1(a), (b) and (c) schematically illustrate different methods for calculating the full CQI and differential CQI. The full CQI can be calculated using the process shown in FIG. 1(a). Specifically, first, channel estimates are obtained, and channel quality measure such as effective SNR is calculated. Then, the full CQI, i.e., the first CQI index, is calculated based on the channel estimates and/or channel quality measures. The differential CQI can be calculated using the processes shown in either FIG. 1(b) or FIG. 1(c). In one embodiment according to the principles of the present invention shown in FIG. 1(b), the difference between two channel quality measures (e.g., the difference of SINR) are first calculated, then the differential/delta CQI index is selected based upon the different between the two channel quality measures. Here, a differential CQI table that establishes the mapping from the difference between two channel quality measures, and the differential/delta CQI index would be needed. In another embodiment according to the principles of the present invention shown in FIG. 1(c), a second CQI index is selected based on the channel estimates and/or channel quality measures. Then, the value of the differential CQI index is obtained by subtracting the index of a first CQI that is reported by a full CQI, from the second CQI index that is reported by the said differential CQI. In other words, the differential operation should be performed on the quantized CQI indices, instead of the channel conditions or other intermediate channel quality measures such as effective SINR, mutual information, transport block size, or normalized transport block sizes. This operation can be represented in an equation as follows, $$\tilde{Q}_{SB,i} = Q_{SB,i} - Q_{WB}. \quad (11)$$

Note that it is straightforward to extend this embodiment by applying the upper limit $I_{SB,max}$ and the lower limit $I_{SB,min}$. And it is also a straightforward extension to choose a different resolution level L for the sub-band CQI. Note that if the differential operation is performed on the channel conditions or other intermediate channel quality measures, both the full CQI and the differential CQI indices will suffer from independent quantization errors that will be accumulated when the differential operation is reversed at the receiver end.

Figure 2:
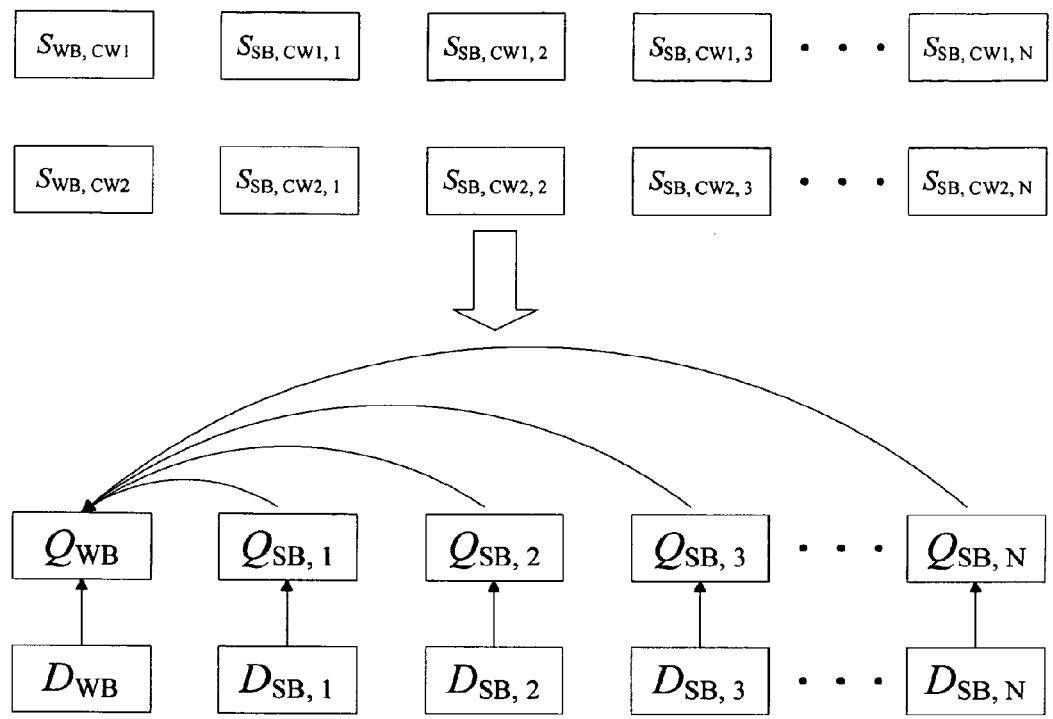
FIG. 2 schematically illustrates a scheme for obtaining frequency and space differential CQI as an embodiment according to the principles of the present invention.

In a fourth embodiment according to the principles of the present invention, the UE needs to report frequency selective MIMO CQI. One example is shown in FIG. 2. Assume UE reports CQI for two MIMO codewords. In 3GPP LTE, this occurs when the rank of the channel is greater than 1. Also note that in LTE, a common rank is reported across the frequency sub-bands. So, in this example, we assume the channel has the same rank in multiple sub-bands and across the wideband. As shown in FIG. 1, a wideband CQI, $Q_{WB}$, and a wideband delta CQI, $D_{WB}$, are reported for channel conditions in the wideband. Note that the delta CQI is the difference between two CQI values. There can be a variety of different interpretation of the average CQI and the differential/delta CQI. For example, if the two CQI reports ($Q_{WB}$ and $D_{WB}$) represents the CQI for two MIMO codewords, the CQI of MIMO codeword 1 (CW1) can be reported by $Q_{WB}$, and the difference between the CQI of CW1 and CW2 can be reported by $D_{WB}$. At the receiver side, the CQI of CW2 can be obtained jointly from the delta CQI and the wideband CQI, e.g., $Q_{WB}$+$D_{WB}$. UE also reports subband MIMO CQI. A frequency differential CQI, $Q_{SB,1}$, and a subband delta CQI, $D_{SB,1}$, are reported in subband 1. There can be a variety of different meaning and interpretation of these CQI reports. For example, if the two CQI reports ($Q_{SB,1}$ and $D_{SB,1}$) represents the CQI for two MIMO codewords, the difference between the CQI of CW1 in subband 1 and the wideband CQI ($Q_{WB}$) can be reported by $Q_{SB,1}$, and the difference between the CQI of CW1 and CW2 can be reported by $D_{SB,1}$. At the receiver side, the CQI of CW1 can be obtained jointly from the sub-band CQI report and the wideband CQI report, e.g., $Q_{WB}$+$Q_{SB,1}$. The CQI of CW2 can be obtained jointly from the wideband CQI report, the subband CQI report, and the sub-band delta CQI, e.g., $Q_{WB}$+$Q_{SB,1}$+$D_{SB,1}$. These operations are also illustrated in FIG. 2. For example, the arrow from $Q_{SB,1}$ pointing to $Q_{WB}$ means that $Q_{SB,1}$ is a differential CQI with respect to the wideband CQI. Likewise, the arrow from $D_{SB,1}$ pointing to $Q_{SB,1}$ means that $D_{SB,1}$ is a delta CQI with respect to the subband CQI. With this framework, the previous embodiments can be extended to the case of frequency differential CQI and MIMO delta CQI.

Assume the wideband channel can be represented by a matrix $\vec{\alpha}_{WB} = [\vec{\alpha}_{SB,i_0} \ \vec{\alpha}_{SB,i_1} \ldots \vec{\alpha}_{SB,i_{N-1}}]^T$ where $\vec{\alpha}_{SB,i_k}$ is the channel matrix for sub-band $i_k$. In simplified cases, some intermediate measures such as channel capacity, mutual information, transport block size, or effective SNR can be obtained from these channel vectors. Assume the intermediate channel quality measure is effective SNR, which is denoted by S. Thus, the intermediate channel quality measure can be obtained from the channel estimate matrices as follows, $S_{WB,CW1} = f_1(\vec{\alpha}_{WB})$, $S_{WB,CW2} = f_2(\vec{\alpha}_{WB})$, $S_{SB,CW1,i} = f_1(\vec{\alpha}_{SB,i})$, and $S_{SB,CW2,i} = f_2(\vec{\alpha}_{SB,i})$. We can choose the reported wideband CQI index as $Q_{WB} = q(S_{WB,CW1})$ and the reported wideband delta CQI index as $D_{WB} = p(q(S_{WB,CW1}),$ $q(S_{WB,CW2})$), where $q(\cdot)$ is the UE's measurement function that estimates the most appropriate CQI index based on the effective SNR, and $p(\cdot)$ is the UE's differential compression scheme. In the simplest form, $D_{WB}=q(S_{SB,CW2})=q(S_{WB,CW1})$).

In the fourth embodiment according to the principles of the present invention, the value of the subband differential CQI index is obtained by subtracting the wideband CQI index from the sub-band CQI index that corresponds to the said differential CQI. In other words, the differential operation should be performed on the quantized CQI indices, instead of the channel conditions or other intermediate channel quality measures such as effective SINR, mutual information, or normalized transport block sizes. Note that if the differential operation is performed on the channel conditions or other intermediate channel quality measures, both the wideband CQI and the subband differential CQI indices will suffer from independent quantization errors that will be accumulated in obtaining the sub-band CQI at the receiver end.

Likewise, the value of the subband MIMO delta CQI index is obtained by subtracting the sub-band CQI index for one codeword from the sub-band CQI index for the other codeword. In other words, the differential operation should be performed on the quantized CQI indices of the MIMO codewords, instead of the channel conditions or other intermediate channel quality measures. Note that although the reference CQI value for the sub-band MIMO delta CQI is the sub-band CQI index for one of the MIMO codewords, the sub-band CQI index is not reported by using full CQI. Instead, that sub-band CQI index is reported by using a differential sub-band CQI. Nevertheless, the aforementioned embodiments such as using different CQI tables, deriving different CQI sub-tables from the same original table, adjusting the upper/lower limit and offset in calculating the differential sub-band CQI or MIMO delta CQI according to the value of the reference CQI, and so on, are applicable to both differential sub-band CQI and MIMO delta CQI calculation. Note the reference CQI can have different interpretation too. For example, for MIMO delta CQI, the reference CQI can be the corresponding sub-band CQI of one of the MIMO codeword, or a wideband CQI of a MIMO codeword.

In a fifth embodiment according to the principles of the present invention, different bit-widths are used for the wideband CQI, subband differential CQI, and the subband MIMO delta CQI. Since wideband CQI serves as a reference to all other CQI, it is desirable to have higher resolution for the wideband CQI. Likewise, the subband differential CQI also serves as an intermediate reference for the subband MIMO delta CQI, so it is also preferable to have a better resolution for the subband differential CQI. For example, we could use 5-bit for wideband CQI indices, 3-bit for subband differential CQI indices, and 2-bit for subband MIMO delta CQI indices.

In a sixth embodiment according to the principles of the present invention, different bit-widths are used for the same kind of CQI in different transmission formats. For example, wideband CQI can be transmitted in both physical uplink control channel (PUCCH) or physical uplink shared channel (PUSCH). Since the resource on PUCCH is more scarce, it is preferable to transmit wideband CQI in PUCCH with less number of bits than to transmit wideband CQI in PUSCH. For example, we can use 5-bit to transmit wideband CQI in PUSCH and 4-bit to transmit wideband CQI in PUCCH.

Figure 3:
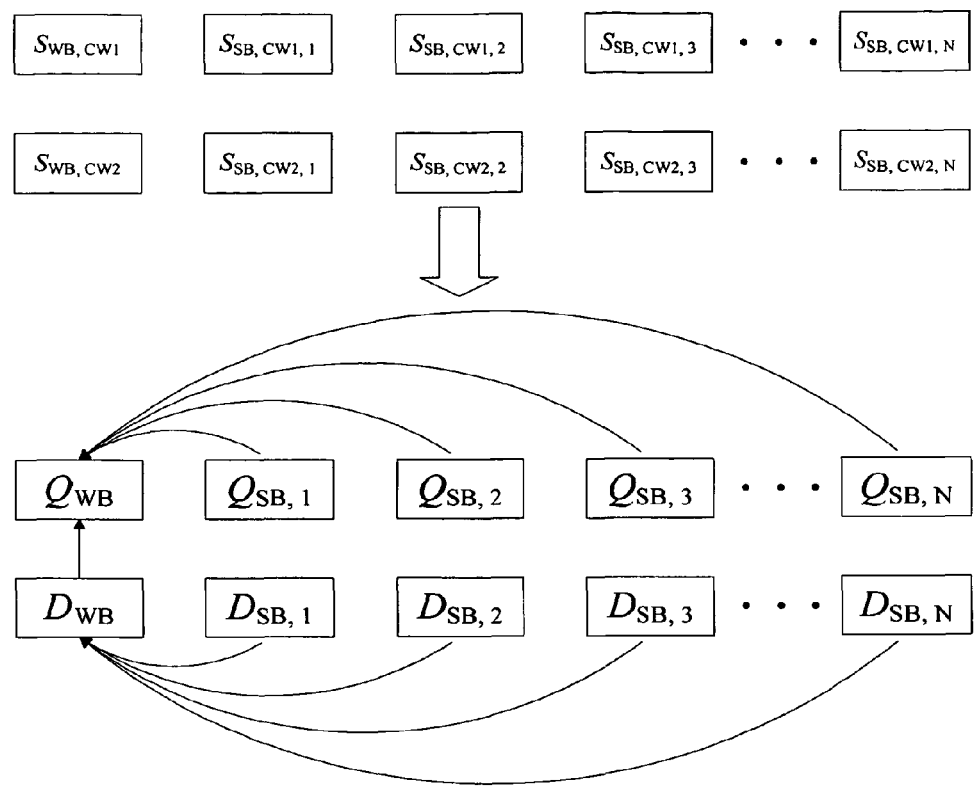
FIG. 3 schematically illustrates a scheme for obtaining frequency and space differential CQI as another embodiment according to the principles of the present invention.
Figure 4:
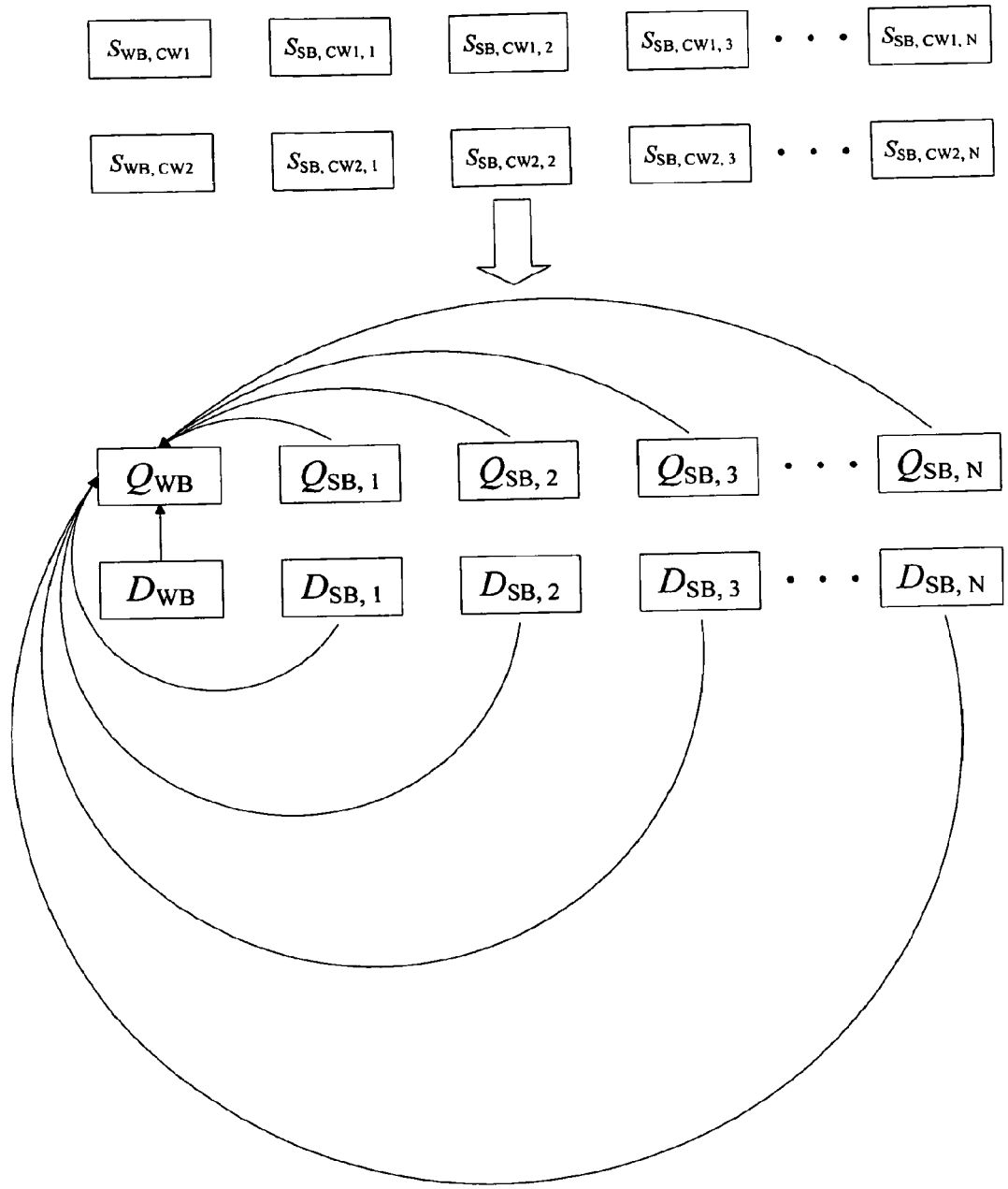
FIG. 4 schematically illustrates a scheme for obtaining frequency and space differential CQI as still another embodiment according to the principles of the present invention.

In a seventh embodiment according to the principles of the present invention, the sub-band delta CQI can be taken with respect to different reference. For example, as shown in FIG. 3, the sub-band delta CQI for CW2 is chosen to be the difference between the subband CQI for CW2 and the wideband CQI index for CW2. Alternatively, the sub-band delta CQI for CW2 can be taken with respect to the wideband CQI for CW1, as shown in FIG. 4. In that case, the wideband CQI for CW1 serves as a reference for all other differential/delta CQI.

In an eighth embodiment according to the principles of the present invention, if a number of element CQI are reported as the average CQI and the differential CQI, one of the element CQI can be omitted. The receiver can infer the omitted element CQI value by the relationship between the average CQI and the element CQI or the relationship among the differential CQI. For example, assume, $$CQI_{Avg} = \frac{1}{N}\sum_{i=0}^{N-1} CQI_i, \quad (12)$$

$$DiffCQI_i = CQI_{avg} - CQI_i$$

The UE only needs to report the average CQI, and (N−1) differential CQI because $$CQI_k = N \times CQI_{avg} - \sum_{i=0, i\neq k}^{N-1} CQI_i, \quad (13)$$

or equivalently, $$DiffCQI_k = -\sum_{i=0 i\neq k}^{N-1} DiffCQI_i.$$

And the base station can use these relationships to derive the omitted differential CQI or element CQI value. This scheme is particularly useful when the number of element CQI is small. For example, N=2, 3, or 4.

While the present invention has been shown and described in connection with the preferred embodiments, it will be apparent to those skilled in the art that modifications and variations can be made without departing from the spirit and scope of the invention as defined by the appended claims.

What is claimed is:

1. A method for communication, the method comprising:
   establishing a channel quality indication table comprising an index column comprising a plurality of channel quality indication indices and a column comprising a plurality of entries associated with corresponding channel quality indication indices, a first number of bits being used when transmitting a channel quality index selected from the plurality of channel quality indication indices of the channel quality indication table;
   establishing a channel quality indication sub-table by selecting a subset of entries in the channel quality indication table;
   selecting, at a first node, a channel quality indication index from the channel quality indication sub-table in dependence upon an estimation of channel quality; and
   transmitting, via the first node, an index of the sub-table associated with the selected channel quality indication index to a second node, the index being transmitted with a second number of bits that is less than the first number of bits.

2. The method of claim 1, in which the column comprising a plurality of entries associated with corresponding channel quality indication indices comprises a modulation scheme column, a code rate column, a nominal spectral efficiency column, or a nominal transport block size column.

3. The method of claim 1, further comprising inserting a set of rows of entries into the established channel quality indication sub-table.

4. An apparatus for communication, the apparatus comprising:
- a memory; and
- at least one processor coupled to the memory, the at least one processor being configured:
  - to establish a channel quality indication table comprising an index column comprising a plurality of channel quality indication indices and a column comprising a plurality of entries associated with corresponding channel quality indication indices, a first number of bits being used when transmitting a channel quality index selected from the plurality of channel quality indication indices of the channel quality indication table;
  - to establish a channel quality indication sub-table by selecting a subset of entries in the channel quality indication table;
  - to select, at a first node, a channel quality indication index from the channel quality indication sub-table in dependence upon an estimation of channel quality; and
  - to transmit, via the first node, an index of the sub-table associated with the selected channel quality indication index to a second node, the index being transmitted with a second number of bits that is less than the first number of bits.

5. The apparatus of claim 4, in which the column comprising a plurality of entries associated with corresponding channel quality indication indices is a modulation scheme column, a code rate column, a nominal spectral efficiency column, or a nominal transport block size column.

6. The apparatus of claim 4, in which the at least one processor is further configured to insert a set of rows of entries into the established channel quality indication sub-table.

7. A non-transitory computer-readable medium having program code recorded thereon, the program code being executed by a processor and comprising:
- program code to establish a channel quality indication table comprising an index column comprising a plurality of channel quality indication indices and a column comprising a plurality of entries associated with corresponding channel quality indication indices, a first number of bits being used when transmitting a channel quality index selected from the plurality of channel quality indication indices of the channel quality indication table;
- program code to establish a channel quality indication sub-table by selecting a subset of entries in the channel quality indication table;
- program code to select, at a first node, a channel quality indication index from the channel quality indication sub-table in dependence upon an estimation of channel quality; and
- program code to transmit, via the first node, an index of the sub-table associated with the selected channel quality indication index to a second node, the index being transmitted with a second number of bits that is less than the first number of bits.

8. The non-transitory computer-readable medium of claim 7, in which the column comprising a plurality of entries associated with corresponding channel quality indication indices is a modulation scheme column, a code rate column, a nominal spectral efficiency column, or a nominal transport block size column.

9. The non-transitory computer-readable medium of claim 7, in which the program code further comprises program code to insert a set of rows of entries into the established channel quality indication sub-table.

10. An apparatus for communication, the apparatus comprising:
- means for establishing a channel quality indication table comprising an index column comprising a plurality of channel quality indication indices and a column comprising a plurality of entries associated with corresponding channel quality indication indices, a first number of bits being used when transmitting a channel quality index selected from the plurality of channel quality indication indices of the channel quality indication table;
- means for establishing a channel quality indication sub-table by selecting a subset of entries in the channel quality indication table;
- means for selecting, at a first node, a channel quality indication index from the channel quality indication sub-table in dependence upon an estimation of channel quality; and
- means for transmitting, via the first node, an index of the sub-table associated with the selected channel quality indication index to a second node, the index being transmitted with a second number of bits that is less than the first number of bits.

11. The apparatus of claim 10, in which the column comprising a plurality of entries associated with corresponding channel quality indication indices is a modulation scheme column, a code rate column, a nominal spectral efficiency column, or a nominal transport block size column.

12. The apparatus of claim 10, further comprising means for inserting a set of rows of entries into the established channel quality indication sub-table.

* * * * *